United States Patent [19]

Johnson et al.

[11] 3,735,855
[45] May 29, 1973

[54] CONTAINER ROTATING APPARATUS
[75] Inventors: John R. Johnson; Benjamin Mercer, Jr., both of Toledo, Ohio
[73] Assignee: Owens-Illinois, Inc., Toledo, Ohio
[22] Filed: Dec. 28, 1970
[21] Appl. No.: 102,006

[52] U.S. Cl. .................198/33 AB, 198/209
[51] Int. Cl. ................................B65g 47/24
[58] Field of Search .........198/33 AB, 212; 214/340; 65/158; 198/209

[56] References Cited
UNITED STATES PATENTS

| | | | |
|---|---|---|---|
| 2,732,926 | 1/1956 | Prion | 198/209 X |
| 3,460,669 | 8/1969 | Johnson | 198/22 AB |
| 2,880,845 | 4/1959 | Carter | 198/33 AB |
| 2,818,159 | 12/1957 | Yeo et al. | 198/209 X |
| 3,197,030 | 6/1965 | Black | 198/137 X |

Primary Examiner—Evon C. Blunk
Assistant Examiner—Douglas D. Watts
Attorney—D. T. Innis and E. J. Holler

[57] ABSTRACT

Apparatus for selectively rotating a container restrained between spaced nesting elements at an inspection station is disclosed. The preferred embodiment includes a cantilever member having one end adapted for insertion between spaced container nesting members to a position adjacent an inspection station, and another end adapted to extend from between the nesting members for attachment to a cantilever support. Means for frictionally engaging a side wall of a container at the inspection station, such as an endless belt, is carried by the cantilever member. The endless belt may be selectively driven by motor and pulley means to impart rotation of the container about its vertical axis.

7 Claims, 7 Drawing Figures

INVENTOR
JOHN R. JOHNSON
BENJAMIN MERCER, JR.
ATTORNEY

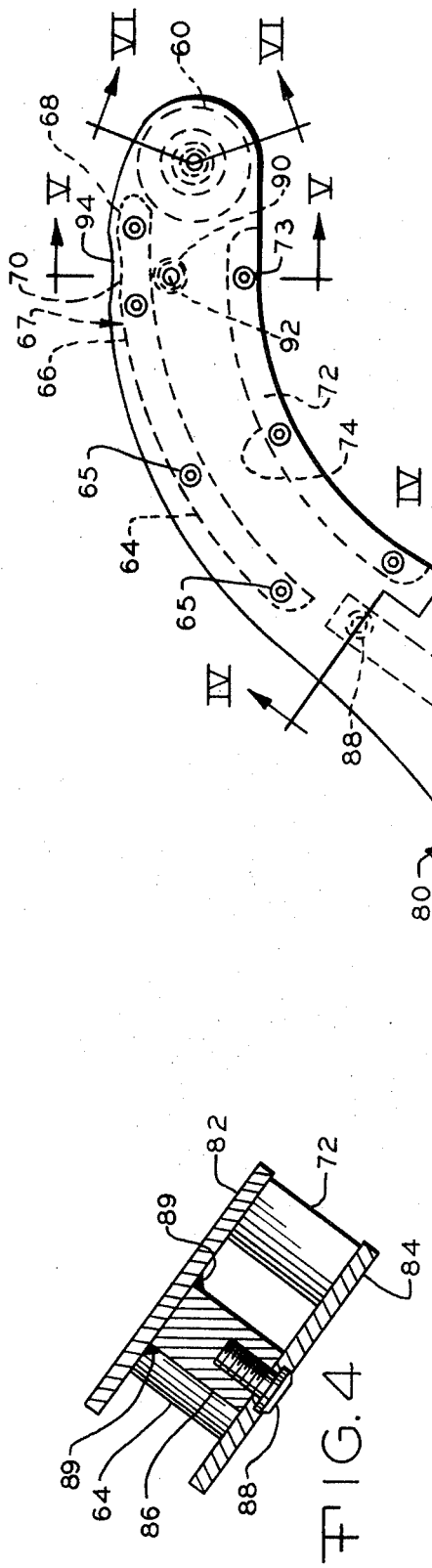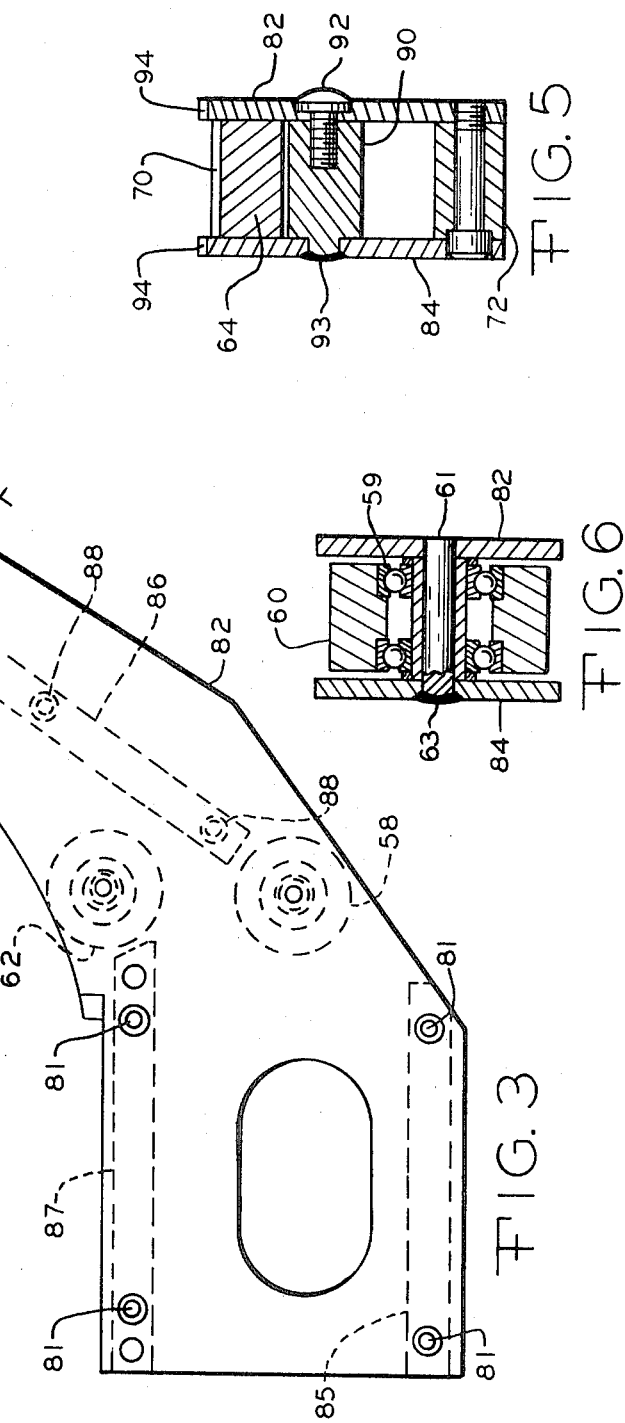

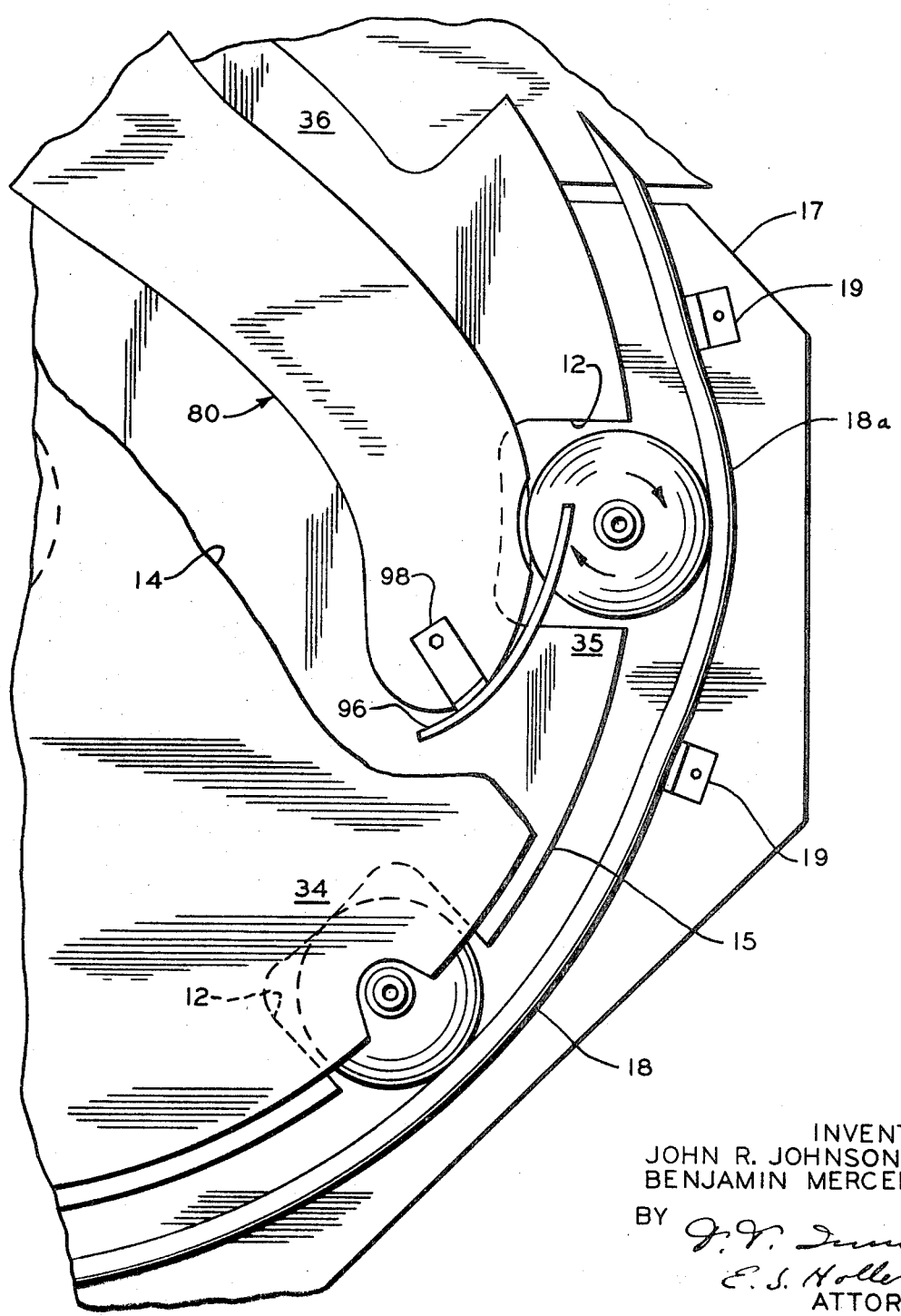

CONTAINER ROTATING APPARATUS

BACKGROUND OF INVENTION

This invention is particularly useful in combination with a bottle handling mechanism for receiving and moving bottles through a plurality of inspection stations, with the bottles being rotated at one or more of the inspection stations.

In glass bottle forming operations, the containers are formed to their final shape and then passed through an annealing lehr where any thermal stresses are removed from the bottles and the bottles are cooled to a temperature approaching that of room temperature. The bottles are then taken from the lehr and placed in line on a conveyor. The bottles are conveyed in spaced relationship along the conveyor, and were inspected by an individual stationed next to the conveyor. After the bottles passed the inspector, the acceptable bottles were packed in cartons or put in use. As the overall quality of container forming has improved, a matching improvement in inspection procedures has been necessary to provide an overall improvement in the containers acceptable for use. Thus, bottles or containers are now introduced into mechanical and optical inspection equipment which will more closely examine each bottle for specific defects and segregate those bottles which are defective from those which are acceptable.

This invention concerns itself with mechanism for moving bottles through a plurality of operation or inspection stations and provides a means for selectively rotating bottles at one or more of the stations, the selective rotating mechanism being simple and effective for rotating a bottle about its axis while the bottle is confined to a specific location so that it may be viewed optically, gauged mechanically, or have another operation performed thereon.

It has been the practice in the past, as shown in U.S. Pat. No. 3,313,409, to provide an indexing table or head which receives containers in pockets formed in the head. The head is then repeatedly indexed through a specific angle or degree of rotation to successively position the containers beneath inspection devices of both optical and mechanical nature. At most of the locations where the inspections are taking place, it is necessary that the containers be rotated about their axes so that the inspection may be complete as far as the entire circumference of the bottle is concerned.

As specifically shown and described in the above-noted patent, the containers may be inspected for internal diameter, outer diameter, height, warp and dip, cocked finish, vertical checks and horizontal checks. With the exception of the internal diameter measurement it is necessary that the bottles be rotated while the measurements are carried out.

Since the invention herein is useful in combination with the mechanism disclosed in the above-noted patent the apparatus will be described briefly here, with reference being made to the patent for a complete description of its operation. The containers are rotated at rotational inspection stations by providing vacuum plate onto which the container is moved by the indexing head. The vacuum plate is then rotated at a fairly high speed. While this was satisfactory for some inspection operations and is operable as a portion of the inventive concept herein it can be seen that considerable mechanism is required, both for providing vacuum connections to the rotating pads, as well as mechanical mechanism geared to the pads so that it may be rotated.

It has also been the practice in mechanism of the type disclosed in the above-cited patent, to elevate the articles by raising the rotatable pad at one or more inspection stations. This is true where the mechanism for gauging is mounted on a fixed support. This arrangement is disclosed in U. S. Pat. No. 3,188,743.

To afford use of different and improved inspection techniques a further advance in the art is disclosed in U. S. Pat. No. 3,460,669. In this device a pocketed indexing head is positioned with its periphery overlying an in-feed portion of a conveyor to receive the containers to be inspected in a pocket of the head. The head is indexed through a predetermined angle to position the container at each of the inspection stations. The containers are confined between the guide rail and an endless belt, with the belt bearing against the side of the container. The belt is supported by pulleys on a bottom plate of the index head and is driven independently of the head so as to rotate the containers about their respective axes for inspection purposes. Thus, in this device all of the containers were rotated at the same time and all containers were rotated at the same speed.

While each of the above patents have disclosed advances in the art, selective rotation at one or more individual inspection stations has been difficult to achieve. It is desirable to be able to change an inspection procedure at a station from one which requires rotation to an inspection procedure in which rotation is undesirable, or vice versa. Moreover, no provision has been made in the prior art for multipurpose stations at which a bottle may be rotated, not rotated to hold the bottle in a stationary position, or to rotate the bottle at a different speed of rotation than that at which the remainder of the bottles are being rotated.

Accordingly, it is an object of this invention to provide improved container handling apparatus.

It is a further object of this invention to provide improved container indexing and rotating apparatus which may have a multipurpose inspection station.

It is a still further object of this invention to provide improved apparatus which may be utilized with existing machines to adapt their operation to the functions desired as set forth herein.

SUMMARY OF THE INVENTION

The above objects of this invention have been illustrated herein in a preferred embodiment of apparatus for receiving containers from an in-feed conveyor, successively indexing the containers to a plurality of operation stations, and discharging the containers at an out-feed conveyor. An indexing head is mounted for rotation about a vertical axis and has a plurality of circumferentially spaced container receiving pockets formed therein. The head is mounted adjacent the in-feed and out-feed conveyor means and is operable to successively index the pockets from a container receiving position with respect to the in-feed conveyor means, to each of the plurality of operation stations, and to a container release position to enable a discharge of the container to the out-feed conveyor means. Means are provided for retaining the containers in the pockets between the receiving and release positions of the indexing head. A device is provided for selectively rotating a container at one or more of the stations and includes an arm extending between the container receiving and releasing positions of the indexing head to a position adjacent the selected station. Means are carried by the arm to contact a side wall of a container at the station to effect rotation thereof.

Other objects, advantages and features of this invention will become apparent when the following description is taken in conjunction with the accompanying drawings, in which:

FIG. 3 is an enlarged plan view of a cantilever arm for carrying means for selectively rotating the container at an individual station;

FIG. 4 is a cross-sectional view of the apparatus of FIG. 3, taken at lines IV—IV of FIG. 3;

FIG. 5 is a cross-sectional view of the apparatus of FIG. 3, taken at lines V—V of FIG. 3;

FIG. 6 is a cross-sectional view of the apparatus of FIG. 3, taken at VI—VI of FIG. 3; and FIG. 7 is a partial top plan view of an alternative embodiment of the teachings of this invention.

DESCRIPTION OF THE PREFERRED EMBODIMENTS

Referring to FIGS. 1 through 6 there is illustrated a first embodiment of the invention. As previously explained, newly formed containers which are to be inspected for defects are placed on a conveyor and a spacing mechanism (not shown) spaces the containers apart at predetermined intervals.

Figure 1:
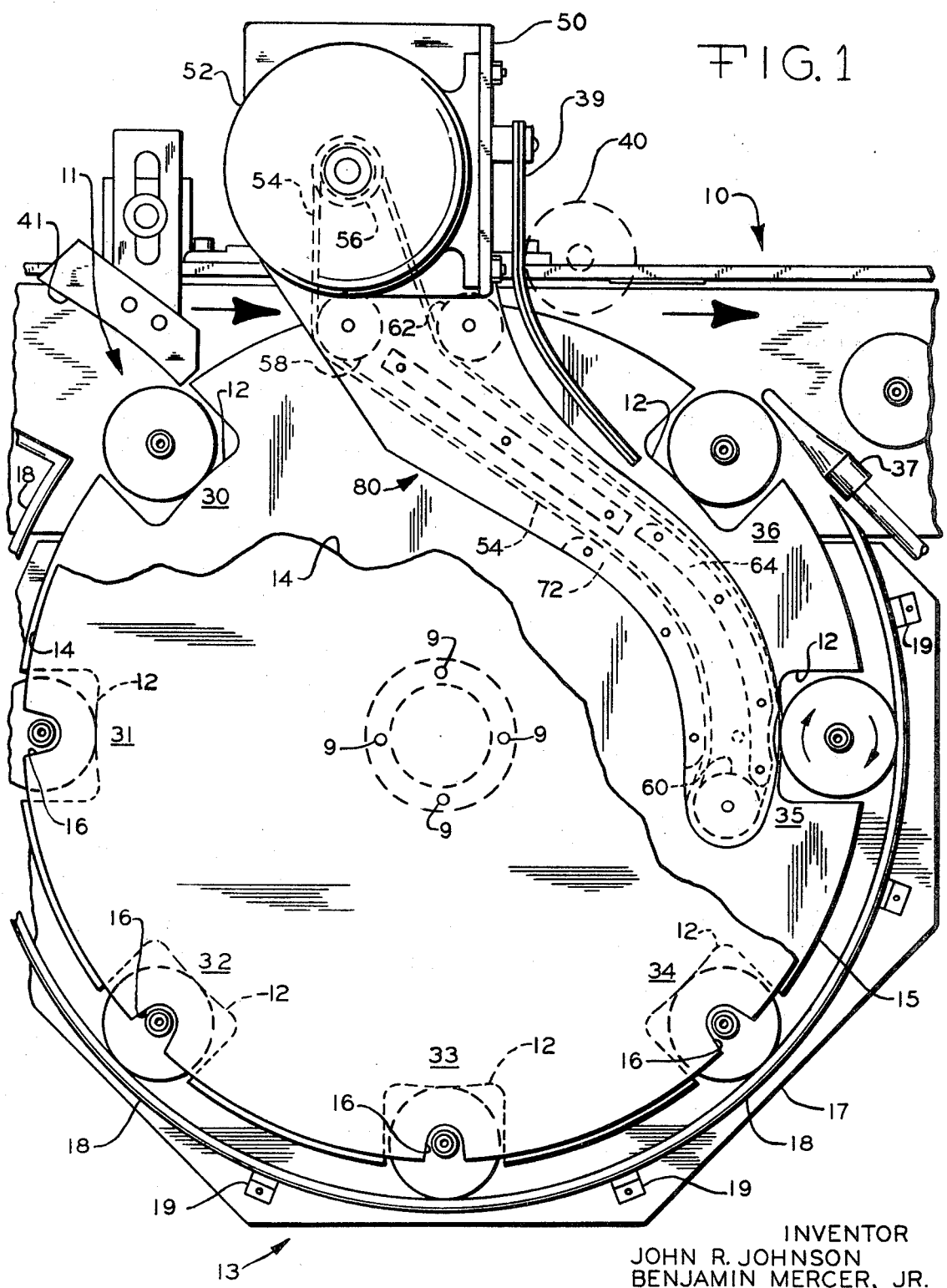
FIG. 1 is a top plan view of the bottle indexing and rotating mechanism of the invention with a portion of the head broken away.

A conveyor 10 having its upper surface moving in the direction of the arrows shown thereon in FIG. 1, has containers positioned thereon in an upright attitude and spaced apart at predetermined intervals which are related to the rate of indexing of the handling mechanism. This timed relationship may be achieved by coupling the drive mechanism for the indexing head to the conveyor drive mechanism so that as a container arrives at the entrance or in-feed area 11, a pocket 12 will be ready to receive the container.

An indexing or rotating head 13 having the pockets 12 formed in its outer periphery, is composed of two spaced-apart, generally circular members 14 and 15. As best shown in FIG. 1, the member 14 is provided with a plurality of neck receiving pockets 16. The pockets 12, which are of a generally rectangular shape, are formed in the periphery of the lower circular member 15. Both of the members 14 and 15 are connected together by spacer units 9 and operate as a single unit or head 13. The head 13 is indexed or rotated about its center by a suitable indexing type drive mechanism, such as the well known Ferguson roller gear drive, or a Geneva drive.

Beneath the rotating members 14 and 15 there is provided a substantially flat table 17 having an upper surface at the same level as the upper surface of the conveyor 10 so that the bottles may be easily slipped from the conveyor to the table.

In order to insure that the bottles arrive in position to be received by the pockets 12 and 16, a guide arm 41 is provided which extends along the side of the conveyor 10 with its downstream end directed toward the mid portion of the conveyor. As the bottles are moved by the conveyor 10, they will engage the guide arm 41 and be directed into the pockets of the head 13.

A rail 18, preferably formed of or coated with plastic such as nylon or Teflon, is supported by clip members 19 attached to table 17 and extends around the circumference of the head 13 from the bottle receiving station 30 to the bottle discharge station 36 of the index head. The rail 18 is spaced outwardly from the head 13 an amount corresponding generally to the position of the side walls of the bottle when positioned within a pocket in the head. When the head is indexed through a predetermined angle, the bottles will be retained within the pockets 12 and 16 by the rail 18 and the table 17 and will be moved in a circular path about the center of the head.

As previously explained, it may be necessary at most inspection locations or stations that the bottles be rotated about their axes. This may be accomplished by the devices shown in the above-referenced patents. The method used in the U.S. Pat. No. 3,460,669, is fragmentarily shown in FIG. 2. Each pocket 12 has a pair of pulleys 20 and 21 associated therewith. The pulleys 20 and 21 are mounted on studs 22 and 23 bolted to the lower member 15. The pulleys 20 and 21 are mounted on the studs to be free to rotate with respect to their supporting studs.

The pulleys 20 and 21 serve as guiding members for an endless belt 24. The drive belt extends around and is guided by similar pairs of pulleys associated with each pocket. In the run of the belt between pocket adjacent pairs of pulleys the belt will be somewhat deflected due to its engagement with a bottle positioned in one of the pockets 12 at an inspection station. A motor may be mounted on the side of the conveyor and through a drive pulley and idler pulleys will rotate the endless belt at a preselected speed, continuously driving the belt to rotate all of the bottles. In this manner the bottles may be rotated at the five operation or inspection stations 31, 32, 33, 34, and 35.

A reject plunger 37, of conventional design, is reciprocably operable by a fluid motor (not shown). If a defective bottle has been sensed at any one of the five inspection stations, the plunger 37 will be moved to a position preventing the particular defective bottle from leaving the head 13, and upon further index of the head 13 the bottle will be swept from the conveyor by deflector arm 39 and moved to the dotted line position 40 where the bottle will be discarded. If the bottle is acceptable the plunger 37 will remain in a retracted position permitting the movement of the upper surface of the conveyor 10 to urge the bottle out of the pocket 12 at the discharge or release station 36 onto the conveyor 10 for later packaging or processing.

Figure 2:
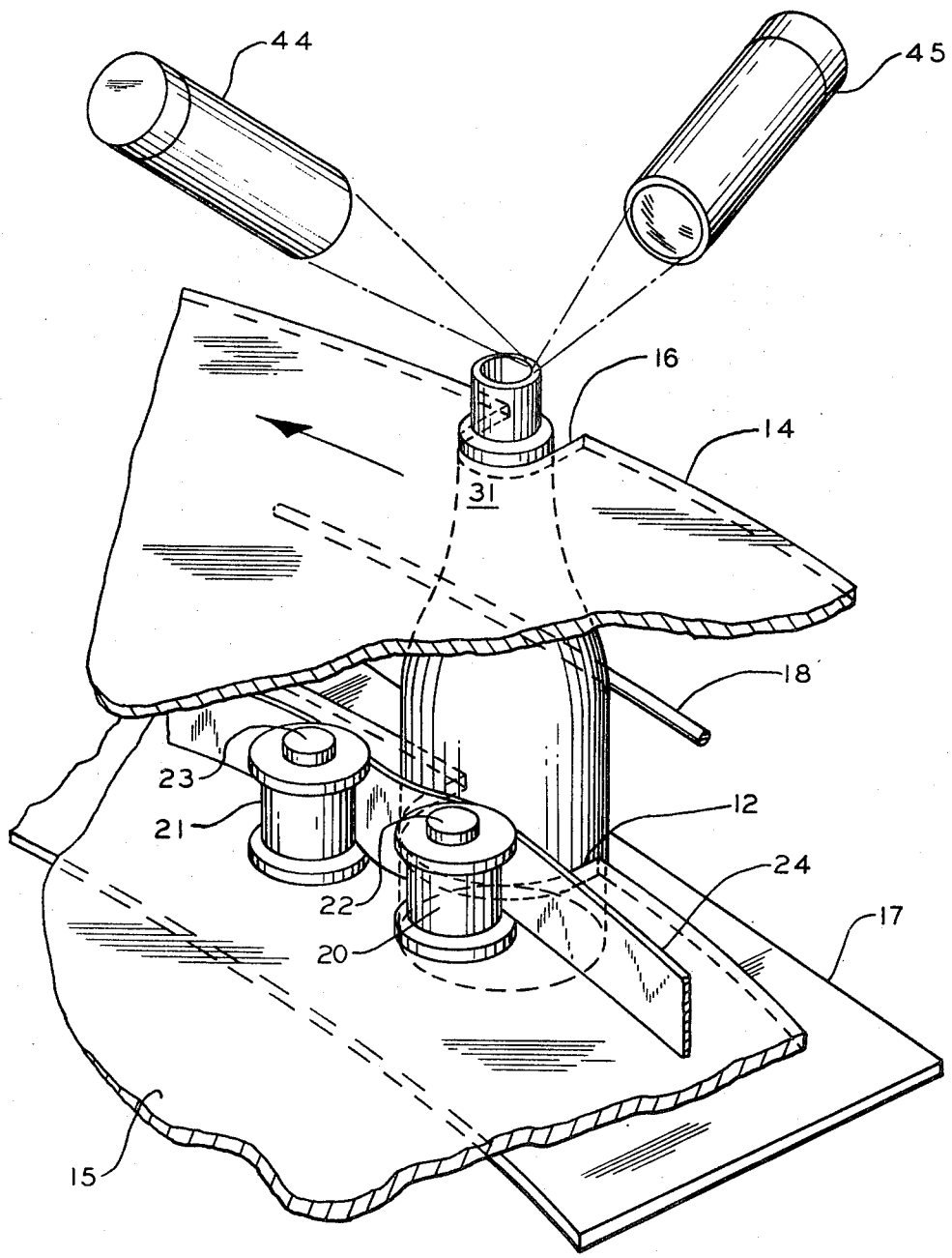
FIG. 2 is a partial perspective view, on an enlarged scale, of one inspection station of the handling mechanism of FIG. 1.

As previously explained, the apparatus illustrated in FIG. 1 for handling and rotating the containers is suited for rotating the containers during inspection at a plurality of inspection stations. FIG. 2 illustrates schematically one of the inspection devices suitable for use at a station during a rotating inspection. The particular inspection device shown comprises a light source 44 and a photocell pickup 45. This optical inspection arrangement would be suitable for inspecting the finish or neck portion of the container for what are termed horizontal checks. It should be understood that this or any other suitable inspection device may be utilized at one or all of the stations illustrated in FIG. 1.

Referring to FIG. 1 there is illustrated a cantilevered arm designated generally at 80 which is connected to a support 50 on the side of the conveyor opposite that of the index head 13. The cantilevered arm 80 extends from the support 50 between the plates 14, 15 of the head 13 and between the container receiving station 30 and the container discharging station 36. Thus the cantilevered arm 80 does not interfere in any way with the pickup and discharge of containers by the indexing head 13, with the operation of the conveyor 10 in its in-feed and out-feed operations, nor with the structure or operation of any of the inspection equipment that may be utilized at stations 31 through 35.

A drive rivet motor 52 is mounted on support 50 and drives an endless belt 54 via a motor pulley 56 for selectively rotating a container at inspection station 35. The endless belt 54 is trained around pulleys 58, 60 and 62 carried by the cantilever arm 80. Arcuate guides 64 and 72 are also carried by the cantilever arm 80 and have the endless belt trained therearound.

Referring to FIGS. 3 through 6 there is shown an enlarged and cross sectional views of the cantilevered arm 80 illustrating in greater detail the components carried by and the parts of the cantilevered arm. The cantilevered arm 80 includes an upper plate 82 and a lower plate 84 connected in a spaced rigid relationship by spacer beams 85, 86, and 87 and a spacer means 90. The spacer beams 85 and 87 may be connected to the plates 82, 84 and to the support 50 by bolts 81. The spacer beam 86 may be connected to plate 84 by bolts 88 and to plate 82 by welds 89 (see FIG. 4). The spacer means 90 may be connected to plate 82 by a bolt 92 and to plate 84 by a weld 93 between the plate 84 and a stud of the spacer 90 (see FIG. 5).

The pulleys 58, 60 and 62 may be rotatably supported on bearings 59 mounted on a stud 61 which is welded at 63 to plate 84. An example of the mounting of the pulleys 58, 60, 62 is shown in FIG. 6.

The configuration of the upper and lower plates 82, 84 of the cantilevered arm will, of course, depend upon which inspection station the cantilever arm 80 is to be positioned adjacent to. In the present case the arm 80 extends outwardly from the support 50 between the receiving and discharge stations 30, 36. The arm then bends obliquely to the right toward the station 35 which it is to service. The arm 80 must avoid interfering with any discharge operations at station 26, whether the discharge from the index head 13 results in a rejection of the container as at 40 or in permitting an acceptable container to be released on container 10. Since it it desirable to approach the pocket 12 at station 35 tangentially, the arm 80 bends to the left and proceeds past station 35 to enable a frictional engagement of a bottle at that station.

Engagement is with a side wall which is diametrically opposed to the side wall which is touching restraining rail 18. Thus, when the endless belt 54 is driven and is urged against the container at station 35, the container tends to be centered between the moving rotating belt 54 and the nylon or Teflon rail 85. This enables reduction of the rotational friction between the sides of pocket 12 and the container. The belt engaging side of the terminal end of the cantilevered arm 80 is thus advantageously tangentially located or oriented with respect to the container at the station selected.

It should be noted that the principles of this invention could be utilized to selectively rotate a container at any of the stations 31 through 35. Further, the concept and principle of this invention could be utilized to selectively rotate more than one container at more than one station. For example, the arm 80 may be extended on past the next station 34, keeping the container adjacent side of the arm 80 at substantially the same radial distance from the center of the indexing head 13 as that already established for station 35. The endless belt 54 would advantageously be kept out of contact with the containers as they index from station 34 to station 35. At each station however, when the container is engaged by the endless belt 54, the arrangement for urging the belt against the container as will be described hereinafter should be applied for most effective frictional engagement.

Referring again to FIG. 3 it can be seen that, in addition to the pulleys 58, 60, and 62, belt guides 64 and 72 have been utilized to guide the belt. It is desirable to save metal and to save space by keeping the width of the cantilevered arm to the minimum necessary to provide a belt protecting and supporting lip beyond the edge of the pulley 60 for as great a distance along the arm as possible. With this design consideration in mind, it is impossible to effectively use pulleys to guide the endless belt between pulley 58 and pulley 60 without reducing the size of the pulley used, or without having equipment extending out from between the arm plates 82, 84, if a spacer beam or beams is to be used in the extremity of the arm to provide a desired rigidity in the arm.

The additional bracing effect at the arm's extremity by a belt guide such as 72 is extremely advantageous. The belt guide 72 may be secured between the plates 82, 84 by a series of bolts 73 to add rigidity. The endless belt 54 is trained on the inner guide surface 74 of the guide member 72.

As discussed above with respect to guiding the endless belt between pulleys 58 and 60, the belt guide member 64 also functions in an advantageous manner to guide the belt 54 from the pulley 60 to the pulley 62. The guide member 64 may be secured to both plates by a series of bolts 65, again adding rigidity to the cantilevered arm. The combination of the upper and lower plates 82, 84 spaced from each other and connected by bracing and spacing beams 85, 86, 87 and guide members 64, 72 provides a cantilevered arm with exceptional strength and rigidity while the weight, amount of material, and thus the cost thereof is greatly reduced.

The guide surface generally indicated at 67 of the guide element 64 includes spaced arcuate surfaces 66, 68 positioned to maintain contact with the side of the belt not engageable with the container. Each of the guide surfaces 66, 68 terminates contact normally with the non-engageable side of the belt before the opposite side of the belt engages the container. This permits deflection of the belt 54 between the spaced arcuate guide surfaces 66, 68 in response to container engagement by the belt and enables an increased area of frictional engagement between the belt and a container. The two spaced arcuate guide surfaces 66, 68 extend convexly toward the station and are connected by an arcuate surface 70 extending concavely away from the station to receive the belt when deflected in response to the container contact. As best seen in FIGS. 3 and 5, matching concave surfaces 94 have been formed in the upper and lower plates 82, 84 in registration with the concave surface 70 formed on the guide element 64 to permit the container to deflect the belt into the concavity 70 without touching the upper and lower plates 82, 84 of the arm 80.

It will be noted that the entire combination of belt rotation and guide surface components have been positioned between the plates 82, 84 so that the belt is exposed exteriorly of its supported and protected position between the plates 82, 84 only at the contact area between the belt and the container. The adjacent terminal ends of surfaces 66, 68 are close enough to the edges of plates 82, 84 so that the container adjacent surface of the belt is urged outwardly past the edges of the plates 82, 84 to prevent container contact with the arm 80 as the container is indexed into and out of the inspection station 35.

The combination illustrated in FIG. 1 is particularly useful with indexing and inspection machines which have individually actuated mechanisms at each station for rotating the containers, such as illustrated in the U. S. Pat. No. 3,313,409. Referring to FIG. 7 there is illustrated a modification of the apparatus of FIG. 1 which enables the use of the cantilevered arm arrangement with an indexing and inspection machine wherein an endless belt is illustrated to rotate the bottles at all stations, a portion of such a mechanism being illustrated in FIG. 2 with the endless belt 24 rotating the bottles.

As noted hereinbefore if the bottles are rotated at all stations by an endless belt 24 they are all rotated at the same time and all are rotated at the same speed. Since it may be desirable to rotate the container at a different speed, in a different direction, or to not rotate the container at all, the cantilevered arm arrangement 80 may be utilized to effect the selective rotation. In the arrangement in FIG. 7 the rail 18 has a portion 18a that has been bowed outwardly at inspection station 35. A standoff finger 96 supported by bracket 98 carried by the cantilevered arm 80 is operative to contact an upper portion of the side wall of the container as it is being indexed from station 34 to station 35 to cause the container to be moved outwardly following the contour of the rail portion 18a. As can be seen, this moves the container radially outwardly so that whenever the indexing head 13 stops at inspection station 35 the container at 35 has been moved out of contact with an endless belt arrangement which rotates all bottles, as illustrated in FIG. 2. Thus there can be no rotation by an endless belt 24.

Correspondingly, the cantilevered arm 80 has been moved outwardly to effect engagement of the cantilever endless belt 54 with the side wall of the container at station 35, permitting selective rotation of the container at station 35 as described hereinbefore. It is to be noted that in a mechanism as illustrated in FIG. 7 the cantilevered arm 80 will be positioned between the plates 14 and 15 above the pulleys 20, 21 utilized in FIG. 2, so that there is no interference between the arm 80 and the operation of the pulleys 20, 21 in supporting the endless belt 24 for a return to its driving mechanism. As can be seen in FIG. 2 a substantial portion of side wall of the container is still available for contact by the belt 54 of the cantilevered arm 80, even though the cantilevered arm 80 is positioned above the pulleys 20, 21. It may be desirable to establish contact between the standoff finger 96 and the container on the shoulder portion of the container to assist in maintaining the stability of the container during the rotation thereof between the standoff finger 96 and the rail portion 18a.

In conclusion, it is pointed out that while the illustrated examples constitute practical embodiments of our invention, we do not limit ourselves to the exact details shown since modification of these details may be made without departing from the spirit and scope of this invention.

We claim:

1. Apparatus for receiving containers from an in-feed conveyor means, successively indexing the containers to a plurality of operation stations, and discharging the containers at an outfeed conveyor means, comprising a. an indexing head mounted for rotation about a vertical axis and having a plurality of circumferentially spaced container receiving pockets formed therein;

b. said head being mounted adjacent the in-feed and out-feed conveyor means and being operable to successively index said pockets from a container receiving position with respect to the in-feed conveyor means, to each of the plurality of operation stations, and to a container release position to enable a discharge of said container to the outfeed conveyor means;

c. means for retaining said containers in said pockets between said receiving and release positions of said indexing head;

d. means for selectively rotating a container at one of said stations including an arm extending between said container receiving and releasing positions of said indexing head to a position adjacent said one station, and means carried by said arm for contacting a side wall of a container at said one station to effect rotation thereof;

e. second means for rotating containers at all of said operation stations including means frictionally engaging another portion of the side wall of a container at each station; and f. means for preventing operation of said second rotating means at said one station including a deflecting finger carried by said arm for urging a container away from frictional engagement with said second rotating means at said one station.

2. Apparatus for selectively rotating a container restrained in a pocket, comprising a. an endless belt for frictionally engaging a side wall of a container in a pocket and rotating the container when driven;

b. a cantilever element for carrying said endless belt, said cantilever element extending from a support therefor past a pocket and having one side adapted to be tangentially oriented with respect to a container in the pocket, said cantilever element including spaced plates connected by a plurality of elongated spacing beams to provide a light weight belt carrying element with sufficient rigidity to maintain said belt in engagement with a container;

c. said endless belt extending from the support end to the container adjacent end of said cantilever element; and d. a pulley carried by said cantilever element and located between said plates at the container adjacent end thereof, said pulley having a diameter sufficiently smaller than the width of said plates to enable said endless belt to be trained therearound and be supported and guided by the peripheral surface of the pulley and the facing surfaces of said spaced plates;

e. one of said elongated spacing beams being located along the tangentially oriented side of said cantilever element and having guide surfaces formed thereon for urging said belt into engagement with a container;

f. said guide surfaces being located on each side of an area into which the belt may be deflected in response to contact with a side wall of a container, the ends of said guide surfaces next to said deflection area being located between said plates to urge the container adjacent side of the belt out from between said plates to inable belt engagement with a container;

g. the edges of said plates of said cantilever arm at the tangential area having concave surfaces formed therein to permit belt deflection in response to container engagement without contact between a container and said cantilever element.

3. Apparatus for receiving containers from an in-feed conveyor means, successively indexing the containers to a plurality of operation stations, and discharging the containers at an out-feed conveyor means comprising a. an indexing head mounted for rotation about a vertical axis and having a plurality of circumferentially spaced container receiving pockets formed therein;

b. said head being mounted adjacent the infeed and out-feed conveyor means and being operable to successively index said pockets from a container receiving position with respect to the in-feed conveyor means, to each of the plurality of operation stations, and to a container release position to enable a discharge of said container to the out-feed conveyor means;

c. means for retaining said containers in said pockets between said receiving and release positions of said indexing head; and d. means for selectively rotating a container at one of said stations including an arm extending laterally from a position adjacent the indexing head and outside of the pockets formed therein inwardly between said container receiving and releasing positions of said indexing head to a position adjacent an interior side of said one station, and means carried by said arm for contacting a side wall of a container at said one station to effect rotation thereof;

e. said container contacting means including an endless belt having a surface supported for frictional engagement with a side wall of a container at said one station, means for selectively driving said belt to rotate a container at said one station about its axis while the container is retained in the pocket at that station, and guide means for said endless belt supported on said arm adjacent said one station, f. said guide means having spaced guide surfaces adjacent said station to permit the deflection of said endless belt therebetween in response to contact with a container being indexed into said one station to provide a larger contact area for the frictional engagement of said belt with a side of a container;

g. said guide means comprising an element having two spaced arcuate guide surfaces extending convexly toward said one station connected by an arcuate surface extending concavely away from said station to receive said belt when deflected in response to container contact.

4. Apparatus for receiving containers from an in!-feed conveyor means, successively indexing the containers to a plurality of operation stations, and discharging the containers at an out-feed conveyor means comprising a. an indexing head mounted for rotation about a vertical axis and having a plurality of circumferentially spaced container receiving pockets formed therein;

b. said head being mounted adjacent the in-feed and out-feed conveyor means and being operable to successively index said pockets from a container receiving position with respect to the in-feed conveyor means, to each of the plurality of operation stations, and to a container release position to enable a discharge of said container to the out-feed conveyor means;

c. means for retaining said containers in said pockets between said receiving and release positions of said indexing head; and d. means for selectively rotating a container at one of said stations including an arm extending laterally from a position adjacent the indexing head and outside of the pockets formed therein inwardly between said container receiving and releasing positions of said indexing head to a position adjacent an interior side of said one station, and means carried by said arm for contacting a side wall of a container at said one station to effect rotation thereof;

e. said container contacting means including an endless belt having a surface supported for frictional engagement with a side wall of a container at said one station and means for selectively driving said belt to rotate a container at said one station about its axis while the container is retained in the pocket at that station;

f. said arm including a pair of plates connected by spacer means, and means carried by and between said plates around which said endless belt is trained to guide said belt between the container engagement position and said driving means.

5. Apparatus for receiving containers from an in-feed conveyor means, successively indexing the containers to a plurality of operation stations, and discharging the containers at an out-feed conveyor means comprising a. an indexing head mounted for rotation about a vertical axis and having a plurality of circumferentially spaced container receiving pockets formed therein;

b. said head being mounted adjacent the in-feed and out-feed conveyor means and being operable to successively index said pockets from a container receiving position with respect to the in-feed conveyor means, to each of the plurality of operation stations, and to a container release position to enable a discharge of said container to the out-feed conveyor means;

c. means for retaining said containers in said pockets between said receiving and release positions of said indexing head;

d. means for selectively rotating a container at one of said stations including an arm extending laterally from a position adjacent the indexing head and outside of the pockets formed therein inwardly between said container receiving and releasing positions of said indexing head to a position adjacent an interior side of said one station, and means carried by said arm for contacting a side wall of a container at said one station to effect rotation thereof;

e. second means for rotating containers at all of said operation station; and f. means for preventing operation of said second rotating means at said one station.

6. Apparatus for selectively rotating a container restrained in a pocket comprising
   a. an endless belt for frictionally engaging a side wall of a container in a pocket and rotating the container when driven;
   b. a cantilever element for carrying said endless belt, said cantilever element extending from a support therefor past a pocket and having one side adapted to be tangentially oriented with respect to a container in the pocket; and
   c. means carried on said cantilever element adjacent the tangentially oriented side thereof for urging said belt into engagement with a container in a pocket;
   d. said cantilever element including spaced plates connected by a plurality of elongated spacing beams to provide a light weight belt carrying element with sufficient rigidity to maintain said belt in engagement with a container;
   e. said endless belt extending from the supported end to the container adjacent end of said cantilever element;
   f. said cantilever element carrying a pulley located between said plates at the container adjacent end thereof, said pulley having a diameter sufficiently smaller than the width of said plates to enable said endless belt to be trained therearound and be supported and guided by the peripheral surface of the pulley and the facing surfaces of said spaced plates;
   g. two of said elongated spacing beams being located intermediate said pulley and said supported end of said cantilevered element and having guide surfaces formed thereon for receiving said endless belt;
   h. the guide surfaces of said elongated spacing beams being located between said plates to enable said endless belt to be trained along and supported by said guide surfaces and between facing surfaces of said plates.

7. Apparatus for selectively rotating a container restrained in a pocket comprising
   a. an endless belt for frictionally engaging a side wall of a container in a pocket and rotating the container when driven;
   b. a cantilever element for carrying said endless belt, said cantilever element extending from a support therefor past a pocket and having one side adapted to be tangentially oriented with respect to a container in the pocket; and
   c. means carried on said cantilever element adjacent the tangentially oriented side thereof for urging said belt into engagement with a container in a pocket;
   d. said cantilever element including spaced plates connected by a plurality of elongated spacing beams to provide a light weight belt carrying element with sufficient rigidity to maintain said belt in engagement with a container;
   e. said endless belt extending from the supported end to the container adjacent end of said cantilever element;
   f. said cantilever element carrying a pulley located between said plates at the container adjacent end thereof, said pulley having a diameter sufficiently smaller than the width of said plates to enable said endless belt to be trained therearound and be supported and guided by the peripheral surface of the pulley and the facing surfaces of said spaced plates;
   g. one of said elongated spacing beams being located along the tangentially oriented side of said cantilever element and having guide surfaces formed thereon for urging said belt into engagement with a container;
   h. said guide surfaces being located on each side of a concavity in said beam into which said belt may be deflected in response to contact with a side wall of a container, the ends of said guide surfaces next to said deflection concavity being located between said plates to urge the container adjacent side of the belt out from between said plates to enable belt engagement with a container.

* * * * *